United States Patent [19]

Striffler, Jr. et al.

[11] 4,269,811
[45] May 26, 1981

[54] PRODUCTION OF LEAD MONOXIDE FROM LEAD SULFATE WITH ACETIC ACID

[75] Inventors: Eugene Striffler, Jr., Hightstown; Michael A. Kolakowski, Milltown, both of N.J.

[73] Assignee: NL Industries, Inc., New York, N.Y.

[21] Appl. No.: 126,625

[22] Filed: Mar. 3, 1980

Related U.S. Application Data

[63] Continuation-in-part of Ser. No. 950,078, Oct. 10, 1978, abandoned.

[51] Int. Cl.³ ............................................. C01G 21/02
[52] U.S. Cl. ..................................... 423/92; 423/435; 423/619
[58] Field of Search .......................... 423/92, 619, 435; 260/436

[56] References Cited

U.S. PATENT DOCUMENTS

| | | | |
|---|---|---|---|
| 428,017 | 5/1890 | Orr | 423/435 |
| 1,720,196 | 7/1929 | Bailey et al. | 423/435 |
| 3,883,348 | 5/1975 | Acoueno et al. | 423/98 |
| 3,892,563 | 7/1975 | La Point | 423/92 |
| 4,118,219 | 10/1978 | Elmore et al. | 423/92 |

Primary Examiner—O. R. Vertiz
Assistant Examiner—Wayne A. Langel
Attorney, Agent, or Firm—Gerald K. White; Eugene Striffler, Jr.; Gary M. Nath

[57] ABSTRACT

An efficient and inexpensive method for producing lead monoxide from lead sulfate bearing materials such as recycled battery mud is provided comprising:
(a) reacting said material with an ammonium carbonate solution to convert lead sulfate to lead carbonate;
(b) decomposing the lead carbonate to form impure lead monoxide;
(c) reacting the impure lead monoxide with acetic acid to form a lead acetate solution;
(d) contacting the lead acetate solution with carbon dioxide to produce insoluble lead carbonate; and
(e) decomposing the lead carbonate to form lead monoxide.

17 Claims, 1 Drawing Figure

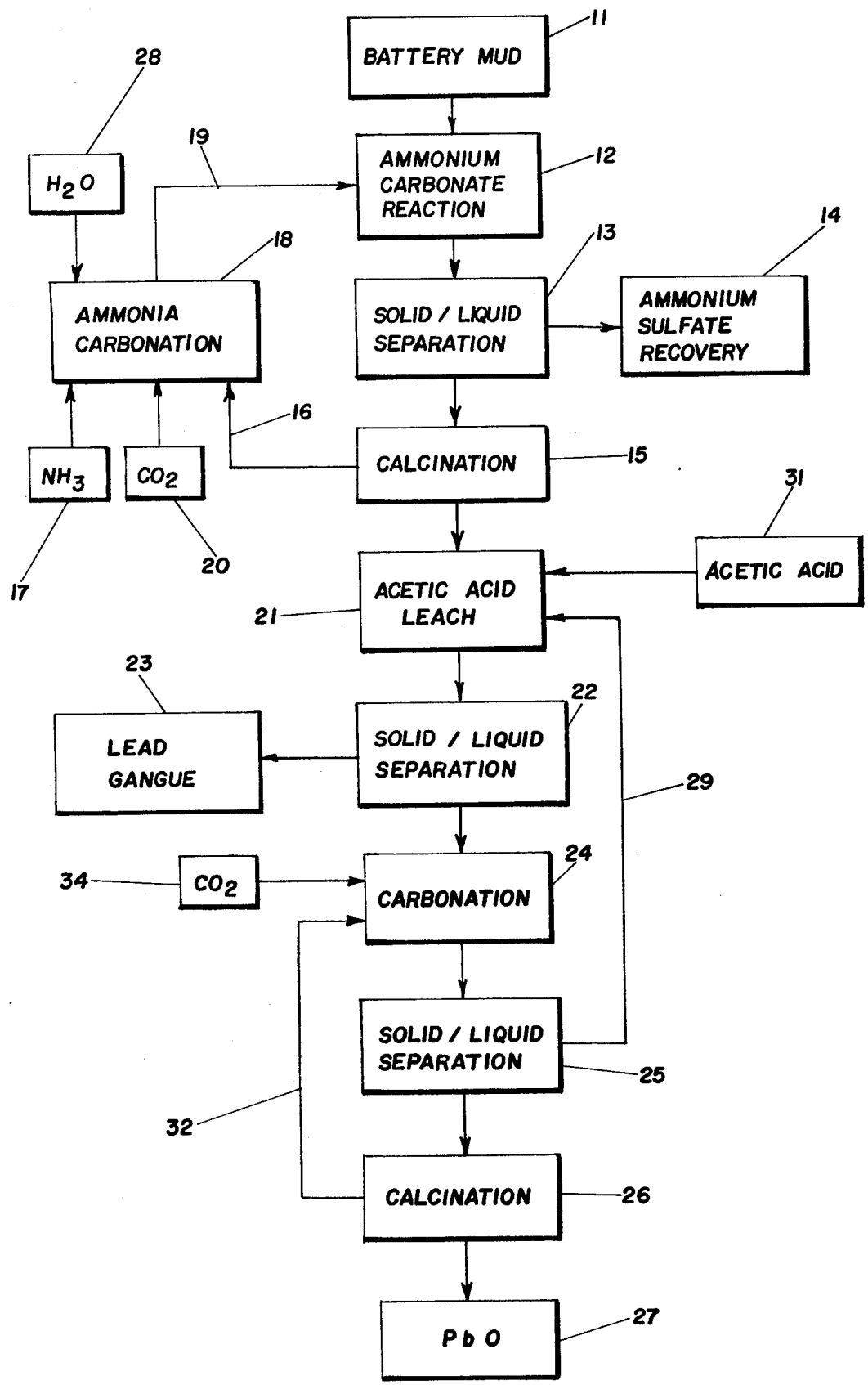

PRODUCTION OF LEAD MONOXIDE FROM LEAD SULFATE WITH ACETIC ACID

This application is a continuation-in-part of application Ser. No. 950,078 filed Oct. 10, 78, abandoned.

This invention is concerned with a process for preparing lead monoxide from impure lead sulfate bearing materials, particularly impure lead sulfate bearing materials such as recycled battery mud.

In the past, lead oxide has been produced by the oxidation of lead metal in a Barton Pot. The greatest single expense of the total manufacturing cost of producing lead monoxide is the cost of the lead metal. Such lead metal may be obtained by reducing reclaimed lead compounds such as lead sulfate, lead oxide and lead alloys from used battery plates. Not only is such lead oxide production costly but also involves the formation of noxious sulfur oxides as by-products which is environmentally unsatisfactory. Accordingly, there is substantial need for a process of producing pure lead monoxide from an inexpensive lead bearing material such as battery mud short of reducing lead compounds therein; refining the metal and oxidizing the so-formed lead metal.

In U.S. Pat. No. 720,670 to A. C. J. Charlier, a method for producing white lead (lead carbonate) from litharge or lead oxide is provided comprising acidifying the oxide and contacting it with carbon dioxide gas under pressure.

In U.S. Pat. No. 1,916,302 to L. P. Curtin, a process for recovering lead in the form of an acetate directly from lead ores, particularly lead sulfide containing galena ore is described. The process comprises roasting the ore by the air-reduction process, to yield a product containing lead oxide, lead sulfate and basic lead sulfate, extracting the product with a solution of lead acetate to remove lead oxide values and extracting the residue from the lead acetate extraction with calcium or ammonium acetate to remove the lead sulfate values. The lead oxide dissolved in the lead acetate solution forms basic lead acetate and may readily be precipitated by means of carbon dioxide as basic or normal lead carbonate. The lead carbonate may in turn be converted into lead monoxide by heating from 400° C. to 475°. Insoluble lead salts such as lead chromate or lead arsenate may be precipitated from the calcium or ammonium acetate solution after extraction.

In U.S. Pat. No. 2,328,089 to J. J. Mulligan, a process is described for recovering soluble lead salts from raw materials such as insoluble lead compounds and impure lead bearing materials, e.g., lead sulfate, lead oxide, lead peroxide, spent litharge, old battery lead plates and lead battery mud or sediment. The soluble lead salts are suitable for the manufacture of lead compounds, such as lead arsenates, chromates, molybdates, tungsates, and acetates.

The aforementioned prior art process comprises first adding an aqueous solution of an alkali metal or ammonium carbonate or hydroxide to the raw material to convert the lead compound therein to an insoluble lead compound. The insoluble residue from this addition is next treated with formic acid or acetic acid wherein the acetic acid preferably contains a reducing agent for lead peroxide contained in the residue, e.g., formic acid, nitrite salts, hydrogen peroxide, and hydrochloric acid. This treatment converts the insoluble lead compound to soluble acetate and formate salts which are in turn combined with appropriate reagents to make lead arsenate, lead chromate, and lead molybdate.

In U.S. Pat. No. 3,883,348 to F. A. Acoveno and T. W. Freudiger, a process for the treatment of lead bearing waste material such as battery mud is provided comprising agitating the waste material in a solution of ammonium carbonate to produce ammonium sulfate and lead carbonate, separating the solids from the liquid and heating the solids to decompose the lead carbonate contained therein to form lead monoxide. The lead monoxide in combination with lead dioxide contained in the solids is used as furnace feed for final reduction to metallic lead. The carbon dioxide released during the carbonate decomposition stage is introduced to a condenser-absorber zone where ammonia and make-up carbon dioxide is added to produce ammonium carbonate. The ammonium carbonate is then passed back or recycled to the leach solution to desulfate incoming waste material.

The present invention provides a multi-step hydrometallurgical process for producing substantially pure lead monoxide from inexpensive lead bearing materials such as battery mud which involves the use of inexpensive and recyclable chemical reagents and physical treatments such as heating and solid/liquid separation.

The process of this invention employs a lead bearing material, particularly a lead sulfate bearing material such as battery mud, which may also contain lead oxides and other impurities.

An unexpected process for preparing lead oxide from lead bearing material has been discovered which comprises:

(a) reacting said material with an ammonium carbonate solution to convert lead sulfate to lead carbonate;

(b) decomposing the lead carbonate to form impure lead monoxide;

(c) reacting the impure lead monoxide with acetic acid to form a lead acetate solution;

(d) contacting the lead acetate solution with carbon dioxide to produce insoluble lead carbonate; and (e) decomposing the lead carbonate to form substantially pure lead monoxide.

Any lead dioxide present in the lead bearing material may also be decomposed along with lead carbonate in step (b) of the process to produce additional lead monoxide. Alternatively, such lead dioxide may be treated with acetic acid in step (c) together with a reducing agent to simultaneously decompose the lead dioxide and form additional lead acetate.

In another embodiment of this invention, a continuous method for producing lead monoxide from a lead sulfate bearing material is provided wherein the by-products of reactions occurring in the above process are used to form the reagents used in the various steps of the process. More particularly, carbon dioxide formed as a by-product of the decomposition of lead carbonate in step (b) can be separated and combined with ammonia to produce the ammonium carbonate solution used in step (a). The carbon dioxide formed as a by-produce of the decomposition of lead carbonate in step (e) can be recycled for use in step (d). The acetic acid produced as a by-product in step (d) can be recycled for use in step (c).

In addition, lead chemicals such as lead chromate, lead arsenate, and lead tungstate can be prepared by precipitation from the lead acetate solution formed in step (c) with appropriate reagents and separating the so-formed lead chemicals from the remaining solution.

FIG. 1 is a flow diagram of the continuous method of this invention.

The starting material for the process of this invention is a lead bearing material, particularly a lead sulfate-bearing material such as battery mud. Such battery mud consists mainly of chemically reactive lead compounds such as lead sulfate, and varying amounts of lead dioxide, lead-antimony alloys and other complex lead bearing compounds. Such battery parts, namely grid metal, plastics, and battery mud fines by well known separatory methods known in the art, from the mud.

According to this invention, the lead bearing material is slurried in water and then reacted with an ammonium carbonate solution wherein the lead sulfate contained therein is reacted and converted to insoluble lead carbonate and soluble ammonium sulfate according to the following reaction:

$$PbSO_4 + (NH_4)_2CO_3 \rightarrow PbCO_3 + (NH_4)_2SO_4$$

Unreacted materials such as lead dioxide remain undissolved in admixture with the insoluble lead carbonate in the ammonium sulfate solution.

Generally an aqueous solution of ammonium carbonate is employed containing from 1.5% to 12.5% ammonium carbonate and preferably about 6.5%. A lead battery mud containing from about 16-18 wt % of sulfate anion can be employed in the first step. Such mud is slurried with water to form a heterogeneous dispersion containing from about 10% to 60% by weight of mud and preferably about 35% by weight. The mud slurry and ammonium carbonate solution are then combined, at a mole ratio of ammonium carbonate to lead sulfate in the mud slurry of from 1:1 to 1.25 at temperatures of from 25° C. to 60° C., and preferably 30° C. Reaction time may vary from 1 minute to 60 minutes but generally all reactions are completed between 5 and 15 minutes.

After the reaction is substantially completed, the ammonium sulfate solution is separated from the lead carbonate and other insoluble materials by conventional solid/liquid separation techniques. The isolated ammonium sulfate solution may then be crystallized to recover solid ammonium sulfate.

Alternatively and more preferably, the ammonium carbonate desulfation of battery mud may be carried out in two stages wherein fresh ammonium carbonate solution is added to the second stage and the ammonium carbonate solution used in the first stage is the unexpected ammonium carbonate solution from the second stage. In this embodiment, virgin battery mud is slurried in the first or primary stage with recovered ammonium carbonate solution from the secondary desulfation stage. The slurry is thickened by removal of supernatant ammonium sulfate solution. The separated ammonium sulfate solution is then sent to an ammonium sulfate crystallizer for recovery of solid ammonium sulfate. The thickened slurry is then reacted with fresh ammonium carbonate in a secondary stage to convert substantially all lead sulfate in the battery mud to lead carbonate and to form additional ammonium sulfate. The lead carbonate and other insolubles in the form of a slurry is thickened and the thickened slurry is filtered and washed in a horizontal vacuum filter. The solution recovered from the thickener, containing both ammonium carbonate and ammonium sulfate is recycled to the first stage desulfation above.

The lead carbonate and other insoluble material separated from the desulfation step are next calcined or heated at temperatures sufficient to decompose the lead carbonate to lead monoxide and carbon dioxide according to the following reaction:

$$PbCO_3 \rightarrow PbO + CO_2$$

Generally, the temperatures required to decompose the lead carbonate are from 400° C. to 650° C., preferably 600° C. Preferably, the heating should be conducted in an inert atmosphere even though it may be conducted in a slightly oxidizing atmosphere. Heating is conducted for between about 15 and 90 minutes to convert substantially all the lead carbonate to lead monoxide. Most usually, however, all decomposition is completed within 60 minutes. The carbon dioxide evolved may be separated from the lead monoxide and reacted with ammonia to form ammonium carbonate which may in turn be used as the ammonium carbonate leach for desulfation of the battery mud. This will be discussed in more detail in connection with FIG. 1 depicting the continuous method of this invention.

Any lead dioxide contained in the insoluble residue after ammonium carbonate treatment may also be decomposed along with the lead carbonate to form additional lead monoxide and oxygen according to the following:

$$2PbO_2 \rightarrow 2PbO + O_2$$

A portion of lead metal contained in the solids is also converted to lead monoxide. The lead monoxide product in admixture with undecomposed lead dioxide or lead carbonate and other insoluble materials is leached with an acetic acid solution (HAc). During this acetic leach step, the lead monoxide reacts with acetic acid to form soluble lead acetate and/or basic lead acetate.

| PbO + HAc | → | PbAc$_2$ + H$_2$O (lead acetate) |
|---|---|---|
| | or | |
| 2PbO + 2HAc | → | PbAc$_2$Pb(OH)$_2$ (basic lead acetate) |

Any undecomposed lead carbonate is converted to soluble lead acetate by acetic acid during the reaction as follows:

$$PbCO_3 + 2HAc \rightarrow PbAc_2 + H_2O + CO_2$$

Alternatively to decompose and react lead dioxide in this step, a reducing agent such as hydrogen peroxide may be added with the acetic acid solution to form lead acetate as follows:

$$PbO_2 + 2HAc + H_2O_2 \rightarrow PbAc_2 + 2H_2O + O_2$$

Generally, a 0.1-15 wt %, preferably a 0.5-5 wt % solution of acetic acid is combined with the products of calcination as a water slurry in stoichiometric ratios of 1:0.5 to 1.5 acetate to reactive lead. While stoichiometric amounts of acetic acid to reactive lead may be employed, best results are achieved at mole ratios of 1:09 to 1.1 due to an unexpected increase in purity of the resultant lead acetate solution and precipitates. Such purity improvement ultimately results in increased lead monoxide purities in the final product as well. The concentration of reactive lead (lead carbonate, lead oxide and lead dioxide) in the calcined feed is not critical but for efficient operation the lead concentration should be from 50% to 99% by weight. The solution is contacted with the slurry at a wide range of temperatures. Increasing temperatures above about 15° C. results in the concomitant increase in reaction rate with preferred conditions being atmospheric pressure at temperatures from about 50° C. to the boiling point of the acetic acid solution. Reaction times between 5 and 60 minutes are necessary to complete the reaction.

The lead acetate solution formed by the reactions between the acetic acid and lead monoxide, undecomposed lead carbonate, if any, and lead dioxide, if any, plus reducing agent are separated from the insoluble residue containing minor amounts basic lead acetate and lead gangue. The insoluble residue is then sent to a smelter to recover the lead values therefrom.

It has also been discovered that the lead concentration of the acetic acid solution has a significant effect upon the purity of the lead acetate solution and precipitate. In this regard it is preferred to utilize a lead concentration of from about 1% to 9.5%. It is believed that an equilibrium reaction between the various soluble and insoluble basic lead acetate compounds exists in the acetic acid solution. It is desired to form $PbOPbAc_2$, a soluble acetate. However, $2PbOPbAc_2$, an insoluble acetate is also formed. The insoluble acetate is lost in the gaugue during separation. When lead concentrations in the acetic acid solution on the order of about 8% are utilized, the gauge loss problem can be minimized to a large extent.

It is somewhat difficult to separate the insoluble gauge materials under ambient temperature conditions. However, when the acetic acid solution is maintained at temperatures of about 50° C. or greater, the gauge materials flocculate and thus separation is materially enhanced.

A portion of the separated lead acetate solution may be used to prepare lead chemicals such as lead chromate, lead tungstate, lead molybdate, lead arsenate and the like by reaction with appropriate reagents.

In order to prepare substantially pure lead monoxide from the lead acetate solution according to this invention, the lead acetate solution is next contacted with carbon dioxide gas under pressure to precipitate lead carbonate and acetic acid according to the following reaction:

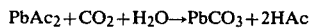

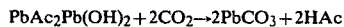

Generally, the carbon dioxide is bubbled into the lead acetate solution at pressures of from atmospheric to 250 p.s.i.g. preferably from 20 to 100 p.s.i.g. at temperatures of from about 5° C. to 95° C., preferably from 40° C. to 60° C. The carbon dioxide is added in an amount of from 0.5 to 1.2 moles per mole of lead in the lead acetate solution. Generally all conversion to lead carbonate is completed within 60 minutes.

The insoluble lead carbonate is next separated from the acetic acid solution and then calcined at temperatures of from 400° to 800° C., preferably from 550° to 650° C., in an inert or slightly oxidizing atmosphere for from one minute to reaction completion, to produce substantially pure lead monoxide and carbon dioxide. The vapors from the calcination are partially condensed to yield an acetic acid solution which can be returned to the leach step. The non-condensed $CO_2$ vapors can be compressed and recycled to the lead carbonate precipitation step in the continuous embodiment of this invention as well be shown in more detail below. The term substantially pure as used herein means the product contains less than 1% impurities such as primary iron oxide and antimony oxide and preferably less than 0.1% impurities.

FIG. 1 shows a process flow diagram of one continuous method according to this invention wherein by-products of various reactions such as carbon dioxide from lead carbonate calcination, acetic acid from the lead acetate carbonation, and carbon dioxide from the lead carbonate calcination are recycled or used to prepare reagents used in the process.

A battery mud feed 11 containing lead sulfate, lead dioxide and other materials is reacted with ammonium carbonate solution 19. The products, comprising an ammonium sulfate solution and insoluble lead carbonate, as well as lead dioxide, are separated at 13. The separated ammonium sulfate solution is then crystallized to recoer solid ammonium sulfate at 14. The solid residues from the separation 13 are calcined at 15 to produce impure lead oxide, oxygen and carbon dioxide. The formed carbon dioxide is drawn off at 16 and combined with ammonia 17 and water 28 in tank 18 to form an ammonium carbonate solution. The ammonium carbonate solution is then added to the battery mud through line 19 at 12 to react with incoming battery mud. A carbon dioxide source 20 is used for start-up and make-up purposes to produce the ammonium carbonate solution. As previously mentioned, the ammonium carbonate desulfation may be carried out where fresh ammonium carbonate feed from the ammonia carbonation reaction at 18 is added to the ammonium carbonate reaction at 12.

After calcination step 15, the impure lead monoxide and other impurities are subjected to an acetic acid leach at 21 to form a solution of lead acetate and an insoluble residue. The lead acetate solution is separated from the solids at 22. The solids, comprising a lead gangue is removed at 23 for smelting. A portion of the lead acetate solution may be used at this point to prepare other lead chemicals as well known in the art. The lead acetate solution is treated with carbon dioxide at 24 to precipitate lead carbonate and form an acetic acid solution. After separation of the insoluble lead carbonate from the solution at 25, the lead carbonate is calcined by heating at 26 to form a pure PbO product at 27 and carbon dioxide.

The acetic acid solution separated at 25 is then recycled to the acetic acid leach step via line 29 to leach incoming lead oxide at 21. Acetic acid solution 31, is used for make-up or start-up purposes.

The carbon dioxide from the calcination 26 is withdrawn in line 32, compressed and recycled to carbonation step 24. Carbon dioxide source 34 is used for start-up and make-up purposes for the carbonation.

The invention will be more fully described with reference to the following Examples. All percentages given are by weight unless otherwise indicated.

EXAMPLE I

Battery mud containing 71% lead, 18% sulfate anion, 21% lead dioxide and minor amounts of antimony, iron and silica was fed to a desulfation reactor (primary reactor) with recycled ammonium carbonate from a second desulfation reactor and reacted to form a slurry containing about 30 to 40% solids. The battery mud was then leached (reacted) at about 20° to 30° C. for 30 minutes to convert 70 to 75% of the lead sulfate content to lead carbonate. The resulting slurry was thickened to a 66% solids level by removal of a supernatant solution containing 17% ammonium sulfate.

The solids slurry was then reacted with a fresh 6.5% ammonium carbonate solution in countercurrent fashion in a secondary desulfation reactor at a 4 to 5:1 mole ratio of ammonium carbonate to lead sulfate to yield a lead carbonate slurry. The slurry was concentrated to a 66% solids level. The resulting slurry was filtered and washed in a horizontal vacuum filter to form a 77% solids cake.

The filter cake was calcined at 550° C. for about 1.5 hours in an inert or slightly oxidizing atmosphere to evaporate residual water and decompose the lead carbonate to lead monoxide and carbon dioxide. Fiber material associated with the battery mud was also decomposed along with lead dioxide to lead monoxide.

The calcined, desulfated battery mud containing lead monoxide in admixture with other solid impurities was combined with a 3.5 to 4.0% solution of acetic acid to form a 14 to 15% solids slurry. The concentration of lead in the calcined feed is from about 75 to 90%. The so-formed mud was leached at 20° to 30° C. for 1 hour resulting in a 3 to 6% solids slurry which was concentrated to a 40 to 45% slurry in a thickener, and then filtered in a horizontal vacuum filter to form a 66% solids cake.

The overflow from the thickener is an 8 to 9% lead acetate solution which was fed to a precipitation reactor. Gaseous carbon dioxide was bubbled into the solution at pressures of from 30 to 50 p.s.i.g. to precipitate lead carbonate. The slurry was then pressure filtered to a 90% solids lead carbonate cake. The filtrate, a 3.5 to 4% acetic acid solution, was recycled to the leach reactor.

The lead carbonate cake was dried and decomposed to lead oxide and carbon dioxide at 600° C. for 2 hours. The resulting substantially pure product had a total impurity concentration of around 1,100 ppm.

EXAMPLE II

The battery mud of example I was desulfated as described in Example I.

The desulfated battery mud containing lead monoxide, lead oxide, lead dioxide, and lead carbonate in admixture with other solid impurities was combined with a 5.3 to 5.8% solution of acetic acid and a 30% hydrogen peroxide solution in a 1:1 stoichiometric ratio with the lead dioxide to form an 8 to 9% lead acetate solution. The mud was leached at 20° to 30° C. for 1 hour. The resulting 2 to 3% solids slurry is concentrated to a 40 to 45% solids slurry in a thickener which is filtered to a 66% solids cake. This cake or gangue is collected and is suitable for conventional smelting operations. The filtrate was returned to the thickener.

The overflow from the thickener was an 8 to 9% Pb lead acetate solution which was fed to a precipitation reactor. Gaseous carbon dioxide is bubbled into the solution at pressures from 30 to 50 p.s.i.g. to precipitate lead carbonate. The slurry was then pressure filtered to a 90% solids lead carbonate cake. The filtrate, a 2.5 to 3.5% acetic acid solution, was concentrated and recycled to the leach reactor.

The lead carbonate was then dried and decomposed to lead oxide and carbon dioxide at 600° C. for 2 hours. The resulting substantially pure product had a total impurity concentration of around 630 ppm.

The invention being thus described, it will be obvious that the same may be varied in many ways, such variations are not to be regarded as a departure from the spirit and scope of the invention, and all such modifications are intended to be within the scope of the following claims.

We claim:

1. A process for producing lead monoxide from solid lead sulfate bearing material which comprises:
    (a) reacting said material with an ammonium carbonate solution to convert said lead sulfate to lead carbonate;
    (b) decomposing substantially all of the lead carbonate to impure lead monoxide by heating at temperatures from about 400° to 650° C.,
    (c) reacting the impure lead monoxide with an effective amount of an acetic acid solution to convert said lead monoxide to a lead acetate solution;
    (d) separating said lead acetate solution from the insoluble impurities;
    (e) contacting the lead acetate solution from step (d) with carbon dioxide gas to form lead carbonate; and
    (f) decomposing the lead carbonate to produce lead monoxide.

2. The process of claim 1 wherein said ammonium carbonate solution contains from 1.5% to 12.5% by weight of ammonium carbonate.

3. The process of claim 1 wherein said impure lead monoxide of step (b) contains undecomposed lead carbonate, said lead carbonate reacting with said acetic acid of step (c) to form lead acetate.

4. The process of claim 1 wherein the concentration of acetic acid in said acetic acid solution of step (c) is from 0.1 to 15%.

5. The process of claim 1 wherein the acetic acid solution of step (c) is added to the impure lead monoxide at a mole ratio of acetate to reactive lead of 1:0.9 to 1.1.

6. The process of claim 1 wherein said carbon dioxide gas is contacted with said lead acetate solution of step (e) at pressures of from atmospheric to 250 p.s.i.g.

7. A process for producing substantially pure lead monoxide from solid lead sulfate bearing battery mud, which comprises:
    (a) reacting an aqueous dispersion of said battery mud with an ammonium carbonate solution to form lead carbonate and an ammonium sulfate solution;
    (b) separating said ammonium sulfate solution from said lead carbonate;
    (c) heating said lead carbonate to between about 400° to 650° C. to decompose substantially all of said lead carbonate to impure lead monoxide;
    (d) reacting said impure lead monoxide with acetic acid solution to convert said lead monoxide to a soluble lead acetate solution and an insoluble residue;
    (e) separating said lead acetate solution from said insoluble residue;

(f) contacting said lead acetate solution from step (e) carbon dioxide gas to form insoluble lead carbonate and acetic acid solution;

(g) separating said lead carbonate from said acetic acid solution; and (h) heating said lead carbonate to form substantially pure lead monoxide.

8. The process of claim 7 wherein step (a) is conducted at between about 25° to 60° C.

9. The process of claim 7 wherein said impure lead monoxide of step (d) is in the form of a water slurry containing from 10% to 25% of impure lead monoxide.

10. The process of claim 7 wherein the concentration of acetic acid in said acetic acid solution of step (d) is from 0.5% to 5%.

11. The process of claim 7 wherein said carbon dioxide gas is contacted with said lead acetate solution in step (f) at pressures of from atmospheric to 250 p.s.i.g.

12. The process of claim 7 wherein said lead carbonate in step (h) is heated to between from 550° to 650°.

13. A process for the continuous production of substantially pure lead monoxide from solid lead sulfate bearing material containing lead dioxide which comprises:

(a) reacting said material with an ammonium carbonate solution to form lead carbonate and an ammonium sulfate solution;

(b) separating the ammonium sulfate solution from the lead carbonate;

(c) heating said lead carbonate to between about 400° to 650° C. to decompose substantially all f said lead carbonate to impure lead monoxide;

(d) reacting the lead monoxide with an effective amount of acetic acid solution to convert said lead monoxide to lead acetate solution and an insoluble residue;

(e) separating said insoluble residue from said lead acetate solution;

(f) contacting said lead acetate solution from step (e) with carbon dioxide gas to form lead carbonate and by-product acetic acid solution;

(g) separating said by-product acetic acid solution from said lead carbonate, said by-product acetic acid solution being used as the acetic acid reactant in step (d) and (h) decomposing said lead carbonate to form substantially pure lead monoxide and a second by-product carbon dioxide gas which is separated from said pure lead monoxide.

14. The process of claim 13 wherein steps (c) and (d) are performed by reacting the lead carbonate and lead dioxide with acetic acid and a reducing agent to form lead acetate.

15. A process for producing lead monoxide from solid lead sulfate bearing material, comprising:

(a) reacting said lead sulfate bearing material with an ammonium carbonate solution containing from 1.5% to 12.5% by weight of ammonium carbonate to convert said lead sulfate to lead carbonate;

(b) decomposing substantially all of the lead carbonate to impure lead monoxide by heating to between about 400° to 650° C.;

(c) reacting the impure lead monoxide with an acetic acid solution having a concentration of from 0.1% to 15% acetic acid and further wherein said acetic acid is added to the impure lead monoxide at a mole ratio of acetate to reactive lead of 1:0.9 to 1.1;

(d) separating said lead acetate solution from the insoluble impurities;

(e) contacting the lead acetate solution from step (d) with carbon dioxide gas to form lead carbonate; and (f) decomposing the lead carbonate to produce lead monoxide.

16. The process of claims 1, 7, 13 or 15, wherein: said acetic acid solution contains about 1.0% to 9.5% lead.

17. The process of claims 1, 7, 13 or 15, wherein: said acetic acid solution is maintained at a temperature from about 50° C. to the boiling point of said acetic acid solution.

* * * * *

UNITED STATES PATENT OFFICE
CERTIFICATE OF CORRECTION

Patent No. 4,269,811　　　　　　Dated May 26, 1981

Inventor(s) Eugene Striffler, Jr. et al

It is certified that error appears in the above-identified patent and that said Letters Patent are hereby corrected as shown below:

Claim 7 (column 9), line 2 - "carbon dioxide gas" should read --with carbon dioxide gas--.

Signed and Sealed this

Fifteenth Day of September 1981

[SEAL]

*Attest:*

GERALD J. MOSSINGHOFF

*Attesting Officer*　　*Commissioner of Patents and Trademarks*